(12) United States Patent
Ginsburg et al.

(10) Patent No.: US 11,761,913 B2
(45) Date of Patent: Sep. 19, 2023

(54) TRANSMISSION X-RAY CRITICAL DIMENSION (T-XCD) CHARACTERIZATION OF SHIFT AND TILT OF STACKS OF HIGH-ASPECT-RATIO (HAR) STRUCTURES

(71) Applicant: BRUKER TECHNOLOGIES LTD., Migdal HaEmek (IL)

(72) Inventors: Adam Ginsburg, Netanya (IL); Mark James Vermeulen, Durham (GB); Paul Anthony Ryan, Darligton (GB); Matthew Wormington, Highlands Ranch, CO (US)

(73) Assignee: BRUKER TECHNOLOGIES LTD., Migdal HaEmek (IL)

( * ) Notice: Subject to any disclaimer, the term of this patent is extended or adjusted under 35 U.S.C. 154(b) by 318 days.

(21) Appl. No.: 17/200,918

(22) Filed: Mar. 15, 2021

(65) Prior Publication Data

US 2021/0341397 A1 Nov. 4, 2021

Related U.S. Application Data

(60) Provisional application No. 63/019,498, filed on May 4, 2020.

(51) Int. Cl.
*G01N 23/201* (2018.01)
*G01N 23/2055* (2018.01)

(52) U.S. Cl.
CPC ....... *G01N 23/201* (2013.01); *G01N 23/2055* (2013.01); *G01N 2223/054* (2013.01); *G01N 2223/056* (2013.01); *G01N 2223/6116* (2013.01)

(58) Field of Classification Search
CPC ....... G01N 2223/054; G01N 2223/056; G01N 2223/6116; G01N 23/201; G01N 23/2055
See application file for complete search history.

(56) References Cited

U.S. PATENT DOCUMENTS

| | | | |
|---|---|---|---|
| 9,606,073 B2 * | 3/2017 | Mazor | G01N 23/201 |
| 9,632,044 B1 * | 4/2017 | Litman | H01L 22/12 |
| 10,352,695 B2 * | 7/2019 | Dziura | G01N 23/201 |
| 10,401,309 B2 * | 9/2019 | Yun | G01N 23/20075 |
| 2017/0167862 A1 * | 6/2017 | Dziura | G01N 23/207 |
| 2017/0169910 A1 * | 6/2017 | Jia | G01N 23/00 |

(Continued)

FOREIGN PATENT DOCUMENTS

WO 2020008420 A3 1/2020

*Primary Examiner* — Dani Fox
*Assistant Examiner* — Soorena Kefayati
(74) *Attorney, Agent, or Firm* — KLIGLER & ASSOCIATES PATENT ATTORNEYS LTD

(57) ABSTRACT

A method for X-ray measurement includes generating and directing an X-ray beam to a sample including at least first and second layers stacked on one another, the X-ray beam incident on a sample location at which the first and second layers include respective first and second high aspect ratio (HAR) structures. X-ray scatter profiles are measured, that are emitted from the sample location in response to the X-ray beam as a function of tilt angle between the sample and the X-ray beam. A shift is estimated, between the first and second layers and a characteristic tilt of the first and second layers, based on the X-ray scatter profiles measured as a function of the tilt angle.

18 Claims, 3 Drawing Sheets

(56) References Cited

U.S. PATENT DOCUMENTS

| | | | |
|---|---|---|---|
| 2018/0020996 A1* | 1/2018 | Wang | G01N 23/20083 |
| | | | 378/43 |
| 2018/0106735 A1* | 4/2018 | Gellineau | G01B 15/04 |
| 2018/0113084 A1* | 4/2018 | Hench | G01N 23/083 |
| 2018/0299259 A1* | 10/2018 | Shchegrov | G01B 11/26 |
| 2018/0328868 A1* | 11/2018 | Bykanov | H01L 21/67288 |
| 2018/0350699 A1* | 12/2018 | Gellineau | G01N 23/20083 |
| 2019/0293578 A1* | 9/2019 | Gellineau | G03F 7/7065 |
| 2019/0302039 A1* | 10/2019 | Artemiev | G01N 23/201 |
| 2019/0323976 A1* | 10/2019 | Vinshtein | G01N 23/20091 |
| 2020/0041426 A1* | 2/2020 | Thompson | G01N 23/201 |
| 2020/0184372 A1* | 6/2020 | Wu | G01N 23/201 |
| 2020/0333267 A1* | 10/2020 | Ito | G01N 23/201 |
| 2020/0333268 A1* | 10/2020 | Ito | G01N 23/201 |

\* cited by examiner

TRANSMISSION X-RAY CRITICAL DIMENSION (T-XCD) CHARACTERIZATION OF SHIFT AND TILT OF STACKS OF HIGH-ASPECT-RATIO (HAR) STRUCTURES

CROSS-REFERENCE TO RELATED APPLICATION

This application claims the benefit of U.S. Provisional Patent Application 63/019,498, filed May 4, 2020, whose disclosure is incorporated herein by reference.

FIELD OF THE INVENTION

The present invention relates generally to material and process analysis, and specifically to systems and methods using X-rays for surface analysis of samples.

BACKGROUND OF THE INVENTION

Various techniques are known in the art for analyzing samples. Some techniques irradiate the sample with X-rays and measure a resulting scatter signal. For example, PCT International Publication WO 2020/008420, whose disclosure is incorporated herein by reference, describes a system capable of determining an orientation of an array of high aspect ratio (HAR) structures of a sample, by (i) obtaining different small angle x-ray scattering (SAXS) patterns for at least one out of different angular relationships or in plane spatial relationships between the sample and an x-ray beam that illuminates the sample; wherein each SAXS pattern represents an angular intensity distribution of scattered x-rays detected by a position sensitive sensor; (ii) calculating, for at least some of the different SAXS patterns, at least one sum of intensities within at least one angular range of the angular intensity distribution to provide a first plurality of sums; and (iii) determining the orientation of the array of HAR holes based at least on the first plurality of suits.

As another example, U.S. Pat. No. 10,352,695 describes methods and systems for characterizing dimensions and material properties of high aspect ratio, vertically manufactured devices using transmission small-angle x-ray scattering (T-SAXS) techniques. Exemplary structures include spin transfer torque random access memory (STT-RAM), vertical NAND memory (V-NAND), dynamic random-access memory (DRAM), three-dimensional FLASH memory (3D-FLASH), resistive random-access memory (Re-PAM), and PC-RAM. In one aspect, T-SAXS measurements are performed at a number of different orientations that are more densely concentrated near the normal incidence angle and less densely concentrated at orientations that are further from the normal incidence angle. In a further aspect, T-SAXS measurement data is used to generate an image of a measured structure based on the measured intensities of the detected diffraction orders.

U.S. Pat. No. 9,606,072 describes an apparatus, including a sample-support that retains a sample in a plane having an axis, the plane defining first and second regions separated by the plane. A source-mount in the first region rotates about the axis, and an X-ray source on the source-mount directs first and second incident beams of X-rays to impinge on the sample at first and second angles along beam axes that are orthogonal to the axis. A detector-mount in the second region moves in a plane orthogonal to the axis and an X-ray detector on the detector-mount receives first and second diffracted beams of X-rays transmitted through the sample in response to the first and second incident beams, and outputs first and second signals, respectively, in response to the received first and second diffracted beams. A processor analyzes the first and the second signals so as to determine a profile of a surface of the sample.

SUMMARY OF THE INVENTION

An embodiment of the present invention that is described hereinafter provides a method for X-ray measurement, the method including generating and directing an X-ray beam to a sample including at least first and second layers stacked on one another, the X-ray beam incident on a sample location at which the first and second layers include respective first and second high aspect ratio (HAR) structures. X-ray scatter profiles are measured, that are emitted from the sample location in response to the X-ray beam as a function of tilt angle between the sample and the X-ray beam. A shift is estimated, between the first and second layers and a characteristic tilt of the first and second layers, based on the X-ray scatter profiles measured as a function of the tilt angle.

In some embodiments, estimating the characteristic tilt of the first and second layers includes estimating one or more of: an average tilt of the first and second layers, an extremum tilt of the first and second layers, and a relative tilt between the first and second layers.

In some embodiments, estimating the shift and the characteristic tilt includes: defining a model, of an X-ray scatter profile as a function of the relative shift and the characteristic tilt, and calculating a fit between the measured X-ray scatter profiles to the model, and extracting the estimated shift and the characteristic tilt from the fit.

In an embodiment, calculating the fit includes applying a regression model to the measured X-ray scatter profiles. In another embodiment, calculating the fit includes: fitting, to the X-ray scatter profiles, functions that include multiple peaks, and solving a regression model for (i) relative intensities of the peaks and (ii) an angular position of a center peak, which best match the measured X-ray scatter profiles.

In some embodiments, estimating the shift and the characteristic tilt includes deducing the shift and the characteristic tilt from the relative intensities and the angular position that best match the measured X-ray scatter profiles.

In other embodiments, calculating the fit includes applying a non-linear regression model to the measured X-ray scatter profiles.

In some embodiments, estimating the shift and the characteristic tilt includes applying a machine learning model to the measured X-ray scatter profiles.

In an embodiment, measuring the X-ray scatter profiles includes combining multiple X-ray scatter measurements from multiple different angular ranges into a combined measured X-ray scatter profile.

In some embodiments, the HAR structures are holes.

There is additionally provided, in accordance with another embodiment of the present invention, a system for X-ray measurement, the system including an X-ray source, optics, and a processor. The X-ray source is configured to generate an X-ray beam. The optics is configured to direct the X-ray beam to a sample including at least first and second layers stacked on one another, the X-ray beam incident on a sample location at which the first and second layers include respective first and second high aspect ratio (HAR) structures. The processor is configured to (a) measure, using a detector, X-ray scatter profiles emitted from the sample location in response to the X-ray beam as a function of tilt angle between the sample and the X-ray beam, and (b) estimate a shift between the first and second layers and a characteristic tilt of the first and second layers, based on the X-ray scatter profiles measured as a function of the tilt angle.

The present invention will be more fully understood from the following detailed description of the embodiments thereof, taken together with the drawings in which:

DETAILED DESCRIPTION OF EMBODIMENTS

Overview

Figure 1:
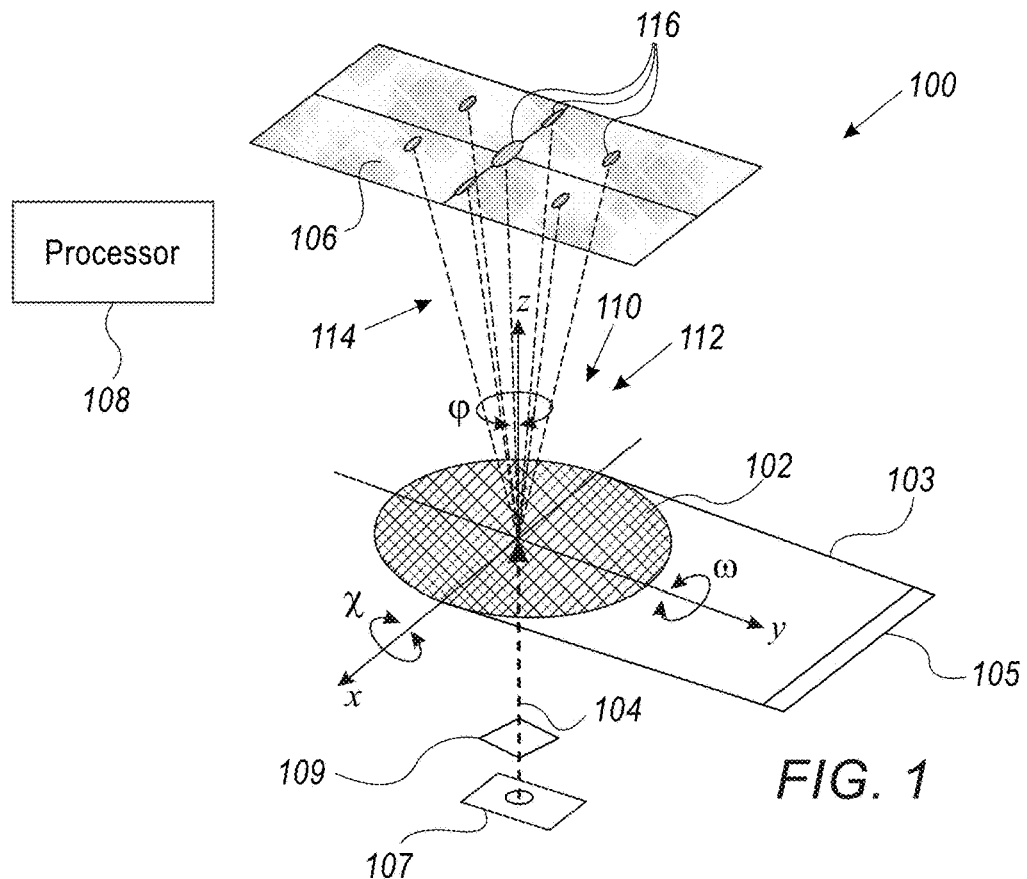
FIG. 1 is a schematic isometric diagram of a transmission X-ray critical dimension (T-XCD) metrology system, in accordance with an embodiment of the present invention.

Embodiments of the present invention that are described herein provide systems and methods of measurement of arrays of scattering objects (structures) using transmission small-angle X-ray scattering (T-SAXS). Named also transmission Critical-dimension SAXS (CD-SAXS), the technique refers to a geometry in which the incident X-ray beam illuminates a first side of a sample, such as a semiconductor wafer, the beam then transmitted through the sample, after which the scattered intensity is measured by a detector on a second side of the sample. The technique is therefore capable of measuring structures that are buried below the surface or are optically opaque. Aspects of SAXS measurements are addressed, for example, in PCT International Publication WO 2020/008420, cited above.

In some embodiments, the X-ray scattering from an array of structures is observed as a series of peaks in the intensity distribution on a position-sensitive X-ray detector. The separation between adjacent peaks is inversely proportional to the period P, which is defined as the spacing between adjacent objects, in the case of a periodic array and to an average separation in an aperiodic array. The relative intensities of these peaks depend on the shape and size of the scattering structures and therefore provide a means of determining their critical dimensions.

Embodiments of the present invention are applicable to various applications, such as, but not limited to, analyzing semiconductor wafers, and thus, the terms "wafer" and "sample" are used interchangeably in the present patent application.

The abovementioned CD-SAXS technique is also referred to as transmission X-ray critical dimension (T-XCD) metrology in the present patent application. (XCD is a registered trademark of Bruker Corp.). This technique is based on small-angle X-ray scattering of X-rays with wavelengths ~0.1 nm from arrays of structures with pitch below a micrometer. The technique can measure a number of parameters including, but not limited to, average shape parameters of the scattering structures such as height(s), width(s), angles, thickness and density of films. T-XCD is sensitive to disorder parameters such as roughness and pitch variation.

The T-XCD technique is capable of measuring a range of materials and dimensions, for example from relatively thin ~1 µm carbon hard mask used in the patterning process to extremely deep>10 µm memory holes in complex multilayers. The technique can be used on microstructures composed of amorphous, polycrystalline and single crystal materials, the strength of the X-ray scattering being proportional to the electron density difference of the scattering structures with respect to their surrounding environment.

Most commonly with the T-XCD technique, a physical model is built that simulates salient features of the sample structure and materials, and the instrument and measurement. The expected intensity distribution in this model is typically calculated on a general-purpose, high-performance, computer.

Measuring shift and tilt of High-Aspect-Ratio (HAR) structures is very challenging. HAR arrays are encountered in the semiconductor and related industries. Stacked HAR structures will be used in the latest generations of 3D NAND flash as well as other advanced memory technologies, such as phase-change (PM) devices. Herein, the aspect ratio is defined by the ratio of transverse (out-of-plane of the wafer) dimension to the lateral dimensions. In the present context, a structure whose aspect ratio is larger than 10:1 is considered a HAR structure.

Embodiments of the present invention relate to X-ray scatterometry measurements (e.g., T-XCD) using the aforementioned transmission geometry and methods for simultaneously determining both the shift between and a characteristic tilt of at least two HAR structures. The methods provide improvements in terms of the accuracy, precision and throughput of the analysis. The results of the analysis can either be used directly for process control, or may be used to provide meaningful starting values and constraints for data fitting using a more detailed physical model.

The disclosed embodiments show that T-XCD is particularly suited to the measurement of structural parameters of both single-layer and stacked HAR structures. Specifically, embodiments of the present invention relate to methods for SAXS characterization and metrology of a shift between and a tilt of at least two arrays of HAR structures stacked atop one another. The characterized tilts may be an average tilt and, in some cases, the relative tilt between the two arrays. In the present context, the term "shift between arrays of structures" (also referred to as overlay) refers to lateral translation, in the plane of the wafer, between the arrays of structures. The term "tilt of arrays of structures" refers to a characteristic angle of the planes of the arrays of structures, such as an average angle at which the structures are oriented relative to a normal to the sample plane.

In some embodiments of the present invention, the calculated and measured intensities are compared using a numerical goodness-of-fit (GOF) parameter, and the model parameters are adjusted so as to minimize the difference between the calculated and measured data. The fitted dataset may comprise one or more 1D datasets such as the intensity distribution of the diffraction peaks for different orientations of the sample, or a series of 2D images of the scattered intensity patterns.

Alternatively, the raw data from the measurements, which may include 1D intensity profiles and/or 2D images for one or more rotation angles, may be fed directly, or after some pre-processing, into a model-free regression engine, such as traditional multi-linear regression or a machine learning algorithm, such as those provided in packages such as Scikit-Learn or TensorFlow. The regression model can then be used to make useful predictions on structural parameters using measured data. Typically, such approaches require high sampling of measured reference data in order to develop reliable regression-based models, but, alternatively, forward simulations using approximate physical models can be used. In another embodiment, a non-linear regression model is used.

The disclosed technique allows the parameters of the relative shift and the tilt of stacked HAR structures, as well as other parameters, to be measured on both test structures in the scribe-lines and also on the devices themselves within the body of the die. The ability to measure on devices rather than on simplified test structures is advantageous, since some parameters may be impacted by other features not present in the test structures, e.g., tilt being influenced by structures introducing localized stresses.

In some embodiments, a method is provided that includes generating and directing an X-ray beam that is incident at a given angle at a sample, at a sample location comprising at least first and second layers stacked on one another of HAR structures with one or more respective shifts between the two or more layers and an average tilt of the structures. During measurements, the sample is variably rotated and x-ray scatter signal that is emitted from the sample location is measured as a function of sample tilt angles. A shift between the first and second layers and an average tilt of the first and second are estimated based on the X-ray scatter signal measured as a function of the sample's rotation angles.

In an embodiment, the estimation is done by (i) defining a model of an X-ray scatter profile as a function of the relative shift and tilt between the first and second layers, and (ii) fitting the measured X-ray scatter profiles to the model, and extracting the estimated shift and tilt from the fit.

In another embodiment, to decrease measurement; time, the method combines X-ray scatter measurements from multiple Regions of interest (ROIs) over the position-sensitive X-ray detector utilizing symmetry properties of the diffracted signal from the location. The different ROIs on the detector correspond to different angular ranges of scattering from the sample; the terms "ROIs" and "angular ranges" are therefore used interchangeably.

System Description

FIG. 1 is a schematic isometric diagram of a transmission X-ray critical dimension (T-XCD) metrology system 100, in accordance with an embodiment of the present invention. System 100 is used to analyze physical characteristics of a macroscopically planar sample 102, such as a silicon wafer that has lithographically patterned features. Sample 102 is assumed to define a three-dimensional set of axes, the sample lying in an xy plane of the axes and defining a z axis as perpendicular to the sample. Without loss of generality the xy plane is regarded as horizontal, and so is the sample.

A system similar to system 100 is described in the aforementioned International Patent Application Publication WO 2020/008420, whose disclosure is incorporated herein by reference.

Sample 102 is mounted on a sample-support 103, also termed "chuck", which allows X-rays to be transmitted via the sample. Typically, chuck 103 comprises a ring-like sample support but other designs are possible, such as a three-point kinematic mount for the sample. Chuck 103 is mounted on an xyz$\omega\chi\varphi$-table 105 (also called a "motion stage" or "processor-controlled table"). Table 105 is controlled by a control unit (not shown) as directed by a processor 108 to make accurate adjustment of sample 102 position along three directions (X, Y and Z), and adjustment of sample 102 orientation in two angles (angle of incidence $\omega$ relative to Y-axis, and azimuthal angle $\chi$ relative to X-axis). The stage is also configured to set a rotation $\varphi$ of sample 102 about z-axis perpendicular to the surface of the sample.

System 100 further comprises an excitation source, such as a high-brightness X-ray source 107, driven by a high-voltage power supply unit (PSU). In some embodiments, source 107 emits an X-ray beam 104 having a suitable energy to penetrate sample 102, e.g., characteristic K$\alpha$ radiation from molybdenum (17 keV), silver or indium, flux and angular divergence. The X-ray beam passes X-ray optics 109, which may include apertures, such as slits, diffractive elements such as crystals or multilayer mirrors to adapt the properties of the beam in terms of intensity, spatial (spot-size), angular (collimation) extent, and range of energies (monochromaticity). The properties of the beam are adjusted based on the structure of the sample being measured. The adapted X-ray beam incidents onto a small region, area 110, of sample 102, typically a spot on the order of <100 μm in diameter, and collimated, typically to an angular resolution<1 milliradians (mrad), in at least one direction.

In some embodiments, a detector assembly 106, such as a pixilated detector, is configured to detect X-ray photons of beams 114 impinging on detector assembly 106 at one or more regions 116 (also called hereinafter (e.g., regions of interest (ROIs) 116). Each ROI 116 corresponds to a respective angular range of scattering from sample 102. In an embodiment, a beam-blocker (not shown) made from an X-ray opaque or partially-opaque material, is located between sample 102 and detector 106, and is configured to occlude at least part of beams 116 from irradiating detector 106. In other embodiments, the beam blocker may be omitted.

The beam path can either be in ambient air or in a partial vacuum to reduce scattering by air, although this partial vacuum is normally not required for X-ray beam energies>10 keV.

A portion of the incident X-rays are scattered from the structures on the sample into multiple beams, and the intensity distributions (counts vs pixel) are measured by 2D pixelated X-ray detector 106. Several X-ray detector technologies are suitable for making such measurements, including but not limited to CMOS detectors and hybrid-photon counting (HPC) detectors with either Si, CdTe or other sensing materials.

In the shown embodiment, pixelated detector 106 measures diffraction orders 114 (i.e., of X-ray photons diffracted by area 110 of sample 102) in and about normal direction to the surface of the sample. Diffracted X-rays 114 are indicative of geometrical properties of patterned structures within area 110. In the context of this description X-ray diffraction is a specific form of X-ray scattering that holds the aforementioned information on macroscopic (e.g., rather than atomic) geometrical properties of the target.

The intensity of the peaks corresponding to the characteristic X-ray scatterings from structures in the sample are identified by software, after which the net intensity (intensity above background) is determined. The difference between the measured and calculated angular spectra is minimized by a linear regression algorithm that automatically adjusts the fitting parameters, as described in FIG. 4 below.

Typically, most of the measurement information, such as the angular resolution and size of the incident X-ray bema, sample scan range and step-sizes and count-times at each step is specified by an engineer or operator ahead of the measurements, but some parameters may be determined dynamically during the measurement based on the alignment gauges and X-ray intensity recorded on a pixelated detector 106. The typical range of angles scanned in measurements of HAR structures is a few degrees.

Several gauges and combinations thereof can be used to determine the surface orientation of sample 102 relative to some datum, such as an incident X-ray beam 104 direction, including but not limited to optical auto-collimators and triangulation gauges, mechanical inclinometers or X-ray diffraction when the sample miscut is properly accounted for.

Rotating sample 102 about the y axis (ω) allows features in the xz plane to be probed, and rotating it about x axis (χ) allows features in the yz plane to be probed. The sample can be translated along x or y axes independently or together in some specified ratio. The range of angles scanned, the type of motion (stepped or continuous), step size and acquisition time per step, as well as other measurement information, is contained in a "recipe" automatically run by processor 108 of system 100.

For example, an in-die structure with dimensions of several, millimeters can be measured with a larger spot-size in the few hundred micrometer range, whereas a small test pad in the narrow scribe line region between dies will require a beam FWHM<50 μm in diameter. Moreover, the collimation will be dictated by the pitch of the arrays to be measured, with a higher degree of collimation being required for larger pitch structures and a lower degree of collimation and hence higher intensity being more optimized for measurement of smaller pitch structures. Representative values of the pitch and divergence used for the measurement of stacked HAR structures would be 150 nm and 0.5 mrad, respectively.

As seen, beam 104 is collimated or focused onto area 110. X-ray beam 104 is capable of penetrating the full thickness of the sample, which is typically a 300 mm silicon wafer or a coupon with thickness around 750 μm. Several source technologies are capable of producing X-rays of such energy including, but not limited to, sealed and rotating anode sources, liquid metal jet sources and also compact accelerator-based sources.

As noted above, beam 102 is diffracted by features of a surface 112 of sample 102, to form diffracted beams 114. For clarity, surface 112 is assumed to comprise a top surface of sample 102, but it will be understood that surface 112 may be either the top or bottom surface of the sample. The other surface of sample 112 is typically a plane. The diffraction from surface 112 in HAR structures is accounted for by the shift and tilt model of the diffracted beam, described below.

System 100 is operated by a processor 108 that uses software stored in a memory of the processor to operate system 100. The software may be downloaded to processor 108 in electronic form, over a network, for example, or it may, alternatively or additionally, be provided and/or stored on non-transitory tangible media, such as magnetic, optical, or electronic memory. Processor 108 typically uses a graphic user interface (GUI) and an input device (both not shown), such as a keypad or a pointing device, or a touch screen for the processor. A user of system 100 may provide input to the system, such as values of operating parameters for the system, as well as receiving results from the system, via the GUI and the input device.

In various embodiments, the different electronic elements of the system shown in FIG. 1 may be implemented using suitable hardware, such as using one or more discrete components, one or more Application-Specific Integrated Circuits (ASICs) and/or one or more Field-Programmable Gate Arrays (FPGAs). For example, some of the readout circuitry of detector assembly 106 may implemented this way.

The configuration of system 100 as shown in FIG. 1 is an example configuration that is chosen purely for conceptual clarity. In alternative embodiments, any other suitable configuration can be used. For example, one in which the source and the detector are rotated coaxially, while the chuck translates as required but does not rotate.

Shift and Tilt Between Stacks of High-Aspect Ratio Structures

Figure 2A:
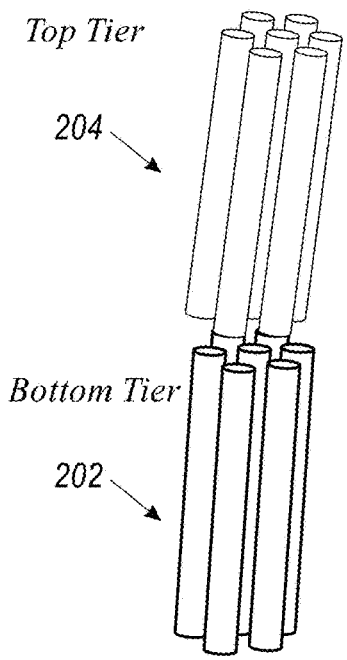
FIGS. 2A-2D are schematic isometric views of a stack of two tiers of High Aspect Ratio (HAR) structures, and views of shifts and tilts of the two tiers, in accordance with an embodiment of the present invention.

FIGS. 2A-2D are a schematic isometric view of a stack of two tiers of HAR structures, and views of shifts and tilts of the two tiers, in accordance with embodiments of the present invention. In the present description the terms "layers" and "tiers" are used interchangeably. FIG. 2A shows a bottom tier 202 and a top tier 204 of HAR structures, which in FIG. 2A are patterned holes.

Figure 2B:
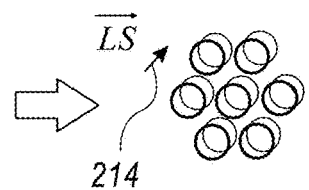
Figure 2C:
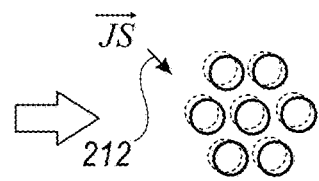
Figure 2D:
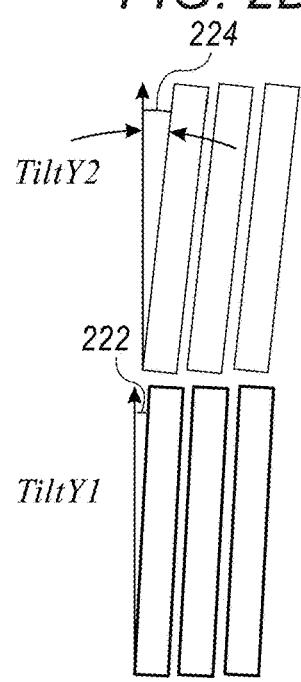

FIGS. 2B and 2C are top-down views of the lithographic shift 214 (top of tier 2 to top of tier 1) and joint shift 212 (bottom of tier 2 to top of tier 1) in the xy-plane, respectively. FIG. 2D is a side view that shows the xz-plane and different tilts 222 and 224 about the y-axis of the two tiers.

As seen in FIGS. 2B and 2C, both the shift and average tilt parameters are vectors ($\vec{JS}$ and $\vec{LS}$, respectively) with components in the x- and y-directions: (JSX, JSY, TiltX1, TiltY1, TiltX2 and TiltY2).

There are two common definitions of shifts used when describing stacked structures: shift due to lithography (LS or overlay), which is defined as the vector offset between the top of both tiers of holes; and the joint shift (JS), which refers to the vector offset at the interface between the top of the lower tier of holes and the bottom of the top tier. Average and relative tilts are determined from the individual tier tilts. The shift and average tilt are thereby given by $$\vec{JS} = (JSX, JSY)$$

$$\vec{LS} = \frac{1}{2}((TiltX1+TiltX2), (TiltY1+TiltY2)) \equiv (TiltX, TiltY)$$

In some embodiments of the disclosed invention, the purpose of the disclosed technique is to determine the four parameters JSX, JSY, TiltX, TiltY.

The illustrations shown in FIGS. 2A-2D were chosen purely for the sake of conceptual clarity. FIG. 2 shows only one embodiment of the present invention. For example, other patterns can be analyzed, such as bars, as would occur to a person skilled in the art. Other definitions of shifts and tilts may be used. Moreover, while FIG. 2 shows two layers of HAR structures, in general the disclosed technique can describe and analyze HAR structures with more than two HAR structures stacked on top the other, with more than a single respective shift between the two or more layers. In such structure the average tilt is of two or more layers.

Diffraction Data Acquisition

In some embodiments, during a metrology session, 2D diffraction intensity distributions are measured for various sample tilt angles ω and χ, respectively, and then these data are simultaneously fit with simulated intensity distributions based on a detailed physical model of the structure in order to determine the shape of the holes in addition to their relative shifts and tilts. However, this can be a relatively long process, both in terms of measurement and analysis, since the intensity distribution is measured over a wide range of intensities. To overcome this limitation, in some embodiments the method may combine X-ray scatter measurements from multiple ROIs, such as ROIs over detection assembly 106, for any measured location on the sample, utilizing spatial symmetry properties of the scattered signal. Still, if sufficient signal can be acquired, the method can be readily used at a single location (i.e., at a single ROI).

Figures 3A, 3B, 3C:
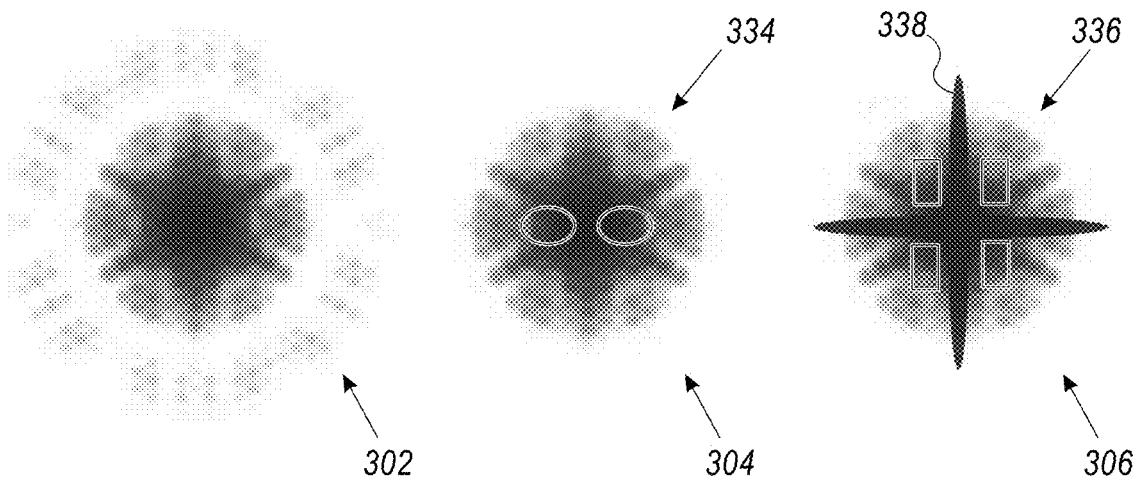
FIGS. 3A-3C are simulated intensity distributions from two-tiers of HAR holes that are representative of advanced 3D NAND memory for $\omega$, $\chi=0°$ (a) with long acquisition time showing high and low intensity diffraction orders (b) for a shorter acquisition showing only the higher intensity diffraction orders, and (c) for the high intensity diffraction orders from the array and "parasitic" scattering from underlying structures such as CMOS logic, in accordance with an embodiment of the present invention.

FIGS. 3A-3C are simulated intensity distributions from two-tiers of HAR holes that are representative of advanced 3D NAND memory for ω, χ=0° (a) with long acquisition time showing high and low intensity diffraction orders 302 (b) for a shorter acquisition shoving only the higher intensity diffraction orders 304, and (c) for the high intensity diffraction orders 306 from the array and "parasitic" scattering 338 from underlying structures such as CMOS logic, in accordance with an embodiment of the present invention.

FIG. 3A shows a simulated diffraction pattern 302 from a hexagonal arrangement of 2-tier HAR structure holes, with a nearest neighbor distance of 150 nm, diameter of 100 nm and height 4 um per tier. As can be seen, the scattering pattern has a radial symmetry with a 60° angular symmetry along angle φ. During the measurement, detection assembly 106 acquires the intensity variation at each given scattering angle of diffracted orders 114.

In an embodiment of the present method, as shown in FIGS. 3B and 3C, detection assembly 106 simultaneously measures the intensities within one or more ROIs 334 and 336, respectively. Typically, the intensities within the various ROIs are combined (e.g., by processor 108 or a mux function of detector 106) by addition (after applying a proper symmetry inversion or rotation), but other operations such as subtraction might be used if they provide improved sensitivity to the parameters of interest for a structure.

The number, shape, size and positions of the ROIs (e.g., ROIs 334 and 336) can be optimized in software for a structure and typically include the high-intensity, low-order diffraction peaks and exclude the direct beam or any part thereof.

In some embodiments, the different ROI measurements are combined to obtain a 1D intensity profile as a function of rotation angle. This procedure may be repeated more than once with scans about different rotation axes, with table 105 performing the sample rotations, e.g., ω-axis with χ-axis fixed (3B), χ-axis with ω-axis fixed (3C) or both ω- and χ-axes scanned together in some ratio. The different scans are chosen so as to allow the slant and tilt components in the x- and y-directions to be determined.

If possible, the ROIs are selected to minimize the influence of the x-components of shift and tilt on the y-components and vice versa. Furthermore, the ROIs may be set up so as to avoid parasitic scattering from the instrument or from structures above or below the HAR structures of interest.

FIGS. 3B and 3C show illustrative ROIs for simulated intensity distributions from a 2-tier stack of 3D NAND channel holes with a reduced acquisition time compared to FIG. 3A. ROIs 334 are typical for an ω-scan from a sample with no parasitic scattering. Possible ROIs 336 are used for a χ-scan from a sample with parasitic scattering pattern 338 from underlying metal structures in CMOS circuitry under the HAR structures of interest (cross-shaped scatter 338). The intensity in the ROIs is combined to create 1D diffraction intensity vs a given tilt angle data.

Figure 4:
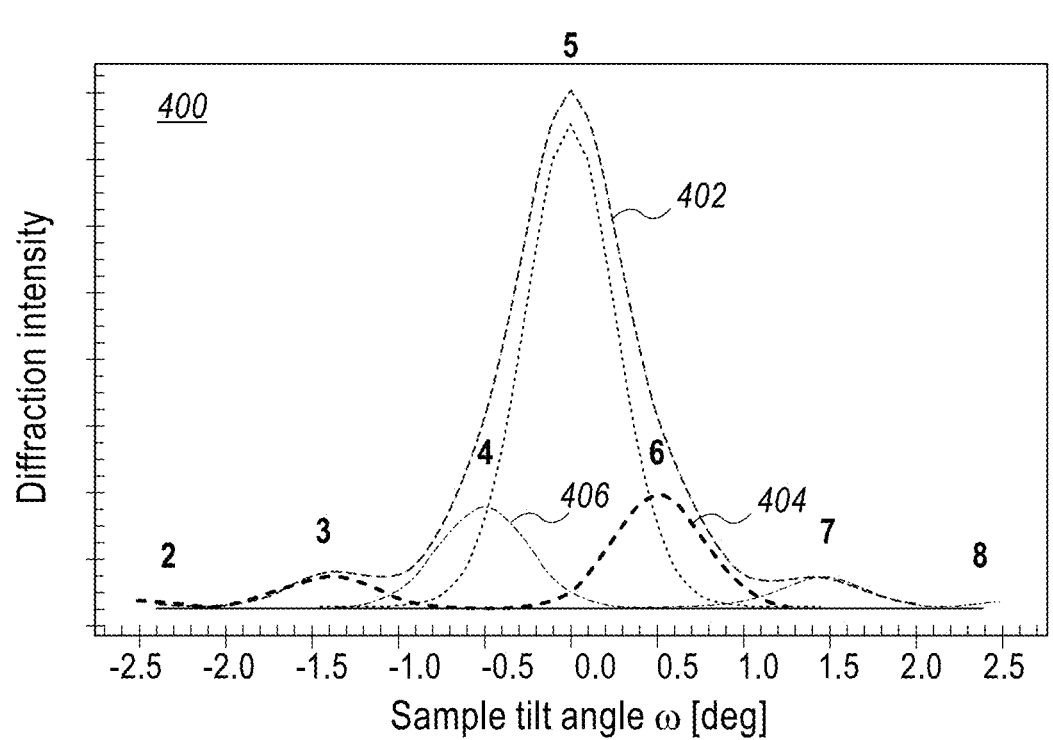
FIG. 4 is a simulated 1D intensity profile and best-fit with 7-peaks for two-tiers of HAR shift holes of JSX=−20 nm, JSY=20 nm, and tilts or TiltX1=−0.4°, TiltX2=0.4°, in accordance with an embodiment of the present invention.

FIG. 4 is a simulated 1D diffraction intensity profile and best-fit with 7-peaks for a two-tier of HAR shift holes of JSX=−20 nm, JSY=20 nm, and tilts of TiltX1=−0.4°, TiltX2=0.4°, in accordance with an embodiment of the present invention. The particular shown intensity profile 402 is a 1D diffraction intensity profile given as a function of the sample tilt angle ω between −2.5° and +2.5° sample inclinations. As noted above, profile 402 is obtained by combining measurements acquired from several ROIs of detector 106.

In an embodiment, the 1D diffraction intensity profiles, such as profile 402, are each fitted with a set of functions with one or more local maxima, such as a set of Gaussian functions of an angle u that comprise multiple peaks, i.e., have two or more local maxima, such as a function $f(u)=Ae^{-D(\alpha-\alpha_1)^2}+Be^{-E(\alpha-\alpha_2)^2}+Ce^{-F(\alpha-\alpha_3)^2}$, A, B, C, D, E, F>0, with angles $\alpha_j$, areas, heights and/or widths of the peaks are optimized using a linear regression. Constraints, such as equality of (some) peak widths and relative positions, may be used to make the peak fitting more robust and prevent the order of peaks from changing.

A representative example of such a model is shown in FIG. 4, which consists of seven Gaussian peaks (labelled 2-8) atop a constant background and with the tallest peak labelled "5." As seen, the triplet of peaks 2, 3 and 6 and triplet of peaks 4, 7 and 8 are local maxima of three-maxima Gaussian functions 404 and 406, such as function $f(u)$.

Some embodiments of the disclosed technique provide peak fitting to data such as in FIG. 4, to extract a HAR shift and tilt, using a regression model, such as multi-linear regression (described below). The best parameters from the peak fitting are selected based on their correlation with the input parameters to the simulations using, for example, an $R^2$ and mean square error statistics (MSE), i.e., the parameters with highest $R^2$ (typically>0.9) and smallest MSE.

The parameters in the intensity profiles, and hence the peak-fitting parameters, are interdependent and thus, for example, the position of peak 5 in FIG. 4 depends on the joint shift components and the average shifts, whereas the ratio of intensities of the smaller (tail) peaks on the left (3,4) and (6,7) are mainly correlated with the joint shift. Therefore, in order to determine both the shift and average tilts, the position and intensity of the empirical peaks are combined and used together.

In the present example, JS and tilt are the predictor variables of both the position of the main peak (5), and the ratio of the intensities of the satellite peaks are R37=(Height3−Height7)/(Height3+Height7)

R46=(Height4−Height6)/(Height4+Height6)

Thus, as an example, a multi linear regression model to analyze FIG. 4 can be applied to obtain the $R^2$ value and the regression equation. In this example, the main peak position and tail peak ratios for both ω- and χ-scans were included as the explanatory variables in order to determine the following four parameters: JSX, JSY, AverageTiltX, AverageTiltY.

Representative examples from of the expressions to determine these parameters from the abovementioned peak height ratios and position of the main peak 5 (Pos5) are as follows:

$$JSX = 0.0934 - 106.527*R37 - 13.228*Pos5$$

$$JSY = 4.190 + 15.404*R37 + 112.537*Pos5$$

$$TiltX = -0.00376 + 1.125*R37 - 0.366*Pos5$$

$$TiltY = -0.0373 + 0.832*R37 - 1.193*Pos5 \quad \text{Eqs. 1}$$

An additional set of regression equations can be constructed from the width of the main peak in the ω- and χ-scans giving the ability to determine RelativeTiltX and RelativeTiltY.

Note that other combinations of peak fit parameters may be found optimal for other structures.

After obtaining regression equations (e.g., Eq. 1) based on simulations, the peak fitting model, as used above, is applied to the measured data in order to determine the HAR shift and tilt components with high throughput.

While simulations were used for building the regression equations in the scheme described above, measured data with external reference information could also be used in this method. Furthermore, use of advanced machine learning and AI techniques may circumvent the need for the empirical peak fitting step altogether.

Figure 5:
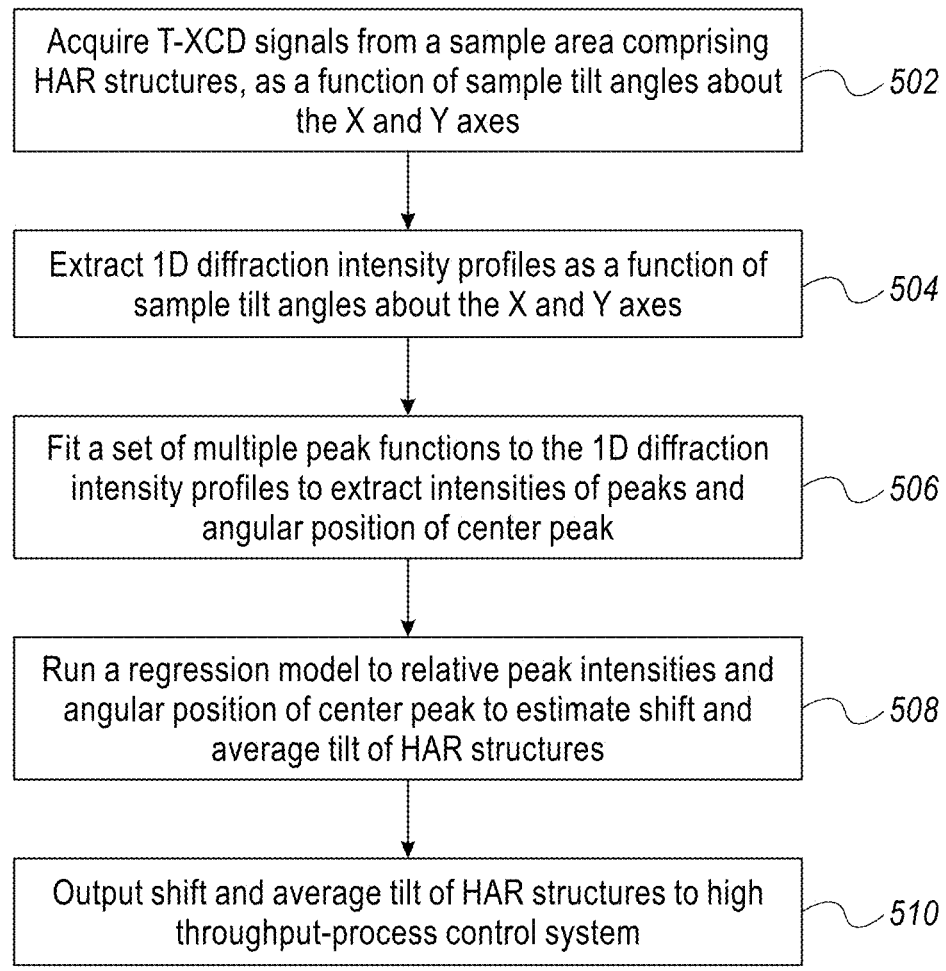
FIG. 5 is a flow chart that schematically illustrates a method for X-ray T-XCD metrology of shift and average tilt of a HAR structure, in accordance with an embodiment of the present invention.

FIG. 5 is a flow chart that schematically illustrates a method for X-ray T-XCD metrology of shift and average tilt of a HAR structure, in accordance with an embodiment of the present invention. The algorithm according to the presented embodiment carries out a process that begins with system 100 acquiring T-XCD signals from a sample 102 area comprising HAR structures, as a function of tilt angles about X and Y axes, at a data acquisition step 502.

Next, processor 108 extracts 1D diffraction intensity profiles as a function of tilt angles about X and Y axes, such as profile 402 shown in FIG. 4, at a diffraction intensity profiles extraction step 504.

Next, processor 108 fits a set of functions, each function having one or more local maxima, to the 1D diffraction intensity profiles to extract the intensities of the fitted peaks, and angular position of the center, highest intensity, peak (e.g., peak 5 in FIG. 4), at a best fitting step 506.

Next, processor 108 runs a linear regression model to relative peak intensities and angular position of center peak to estimate a shift and average tilt of the HAR structures, at a HAR shift and tilt estimation step 508.

Finally, at HAR shift; and tilt outputting step 510, processor 108 outputs the HAR relative shift and tilt to a height throughput process control system.

The process flow shown in FIG. 5 is brought by way of example. Alternative steps may be performed, such as applying a machine learning model instead of a linear regression model.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for X-ray measurement, the method comprising:
    generating and directing an X-ray beam to a sample comprising at least first and second layers stacked on one another, the X-ray beam incident on a sample location at which the first and second layers comprise respective first and second high aspect ratio (HAR) structures;
    measuring X-ray scatter profiles emitted from the sample location in response to the X-ray beam as a function of tilt angle between the sample and the X-ray beam; and
    estimating a shift between the first and second layers and a characteristic tilt of the first and second layers, based on the X-ray scatter profiles measured as a function of the tilt angle, including:
        defining a model of an X-ray scatter profile as a function of the relative shift and the characteristic tilt; and
        calculating a fit between the measured X-ray scatter profiles to the model, and extracting the estimated shift and the characteristic tilt from the fit.

2. The method according to claim 1, wherein estimating the characteristic tilt of the first and second layers comprises estimating one or more of: an average tilt of the first and second layers, an extremum tilt of the first and second layers, and a relative tilt between the first and second layers.

3. The method according to claim 1, wherein calculating the fit comprises applying a regression model to the measured X-ray scatter profiles.

4. The method according to claim 1, wherein calculating the fit comprises:
    fitting, to the X-ray scatter profiles, functions that comprise multiple peaks; and
    solving a regression model for (i) relative intensities of the peaks and (ii) an angular position of a center peak, which best match the measured X-ray scatter profiles.

5. The method according to claim 1, wherein calculating the fit comprises applying a non-linear regression model to the measured X-ray scatter profiles.

6. The method according to claim 1, wherein measuring the X-ray scatter profiles comprises combining multiple X-ray scatter measurements from multiple different angular ranges into a combined measured X-ray scatter profile.

7. The method according to claim 1, wherein the HAR structures are holes.

8. The method according to claim 4, wherein estimating the shift and the characteristic tilt comprises deducing the shift and the characteristic tilt from the relative intensities and the angular position that best match the measured X-ray scatter profiles.

9. A method for X-ray measurement, the method comprising:
    generating and directing an X-ray beam to a sample comprising at least first and second layers stacked on one another, the X-ray beam incident on a sample location at which the first and second layers comprise respective first and second high aspect ratio (HAR) structures;

measuring X-ray scatter profiles emitted from the sample location in response to the X-ray beam as a function of tilt angle between the sample and the X-ray beam; and estimating a shift between the first and second layers and a characteristic tilt of the first and second layers, based on the X-ray scatter profiles measured as a function of the tilt angle, by applying a machine learning model to the measured X-ray scatter profiles.

10. A system for X-ray measurement, the system comprising:

an X-ray source configured to generate an X-ray beam;

optics configured to direct the X-ray beam to a sample comprising at least first and second layers stacked on one another, the X-ray beam incident on a sample location at which the first and second layers comprise respective first and second high aspect ratio (HAR) structures; and a processor, which is configured to:

measure, using a detector, X-ray scatter profiles emitted from the sample location in response to the X-ray beam as a function of tilt angle between the sample and the X-ray beam; and estimate a shift between the first and second layers and a characteristic tilt of the first and second layers, based on the X-ray scatter profiles measured as a function of the tilt angle, including:

defining a model of an X-ray scatter profile as a function of the relative shift and the characteristic tilt; and calculating a fit between the measured X-ray scatter profiles to the model, and extracting the estimated shift and the characteristic tilt from the fit.

11. The system according to claim 10, wherein the processor is configured to estimate the characteristic tilt of the first and second layers by estimating one or more of: an average tilt of the first and second layers, an extremum tilt of the first and second layers, and a relative tilt between the first and second layers.

12. The system according to claim 10, wherein the processor is configured to calculate the fit by applying a regression model to the measured X-ray scatter profiles.

13. The system according to claim 10, wherein the processor is configured to calculate the fit by:

fitting, to the X-ray scatter profiles, functions that comprise multiple peaks; and solving a regression model for (i) relative intensities of the peaks and (ii) an angular position of a center peak, which best match the measured X-ray scatter profiles.

14. The system according to claim 10, wherein the processor is configured to calculate the fit by applying a non-linear regression model to the measured X-ray scatter profiles.

15. The system according to claim 10, wherein the processor is configured to measure the X-ray scatter profiles by combining multiple X-ray scatter measurements from multiple different angular ranges into a combined measured X-ray scatter profile.

16. The system according to claim 10, wherein the HAR structures are holes.

17. The system according to claim 13, wherein the processor is configured to deduce the shift and the characteristic tilt from the relative intensities and the angular position that best match the measured X-ray scatter profiles.

18. A system for X-ray measurement, the system comprising:

an X-ray source configured to generate an X-ray beam;

optics configured to direct the X-ray beam to a sample comprising at least first and second layers stacked on one another, the X-ray beam incident on a sample location at which the first and second layers comprise respective first and second high aspect ratio (HAR) structures; and a processor, which is configured to:

measure, using a detector, X-ray scatter profiles emitted from the sample location in response to the X-ray beam as a function of tilt angle between the sample and the X-ray beam; and estimate a shift between the first and second layers and a characteristic tilt of the first and second layers, based on the X-ray scatter profiles measured as a function of the tilt angle, by applying a machine learning model to the measured X-ray scatter profiles.

* * * * *